United States Patent
Jeschke et al.

(10) Patent No.: US 7,245,601 B2
(45) Date of Patent: Jul. 17, 2007

(54) METHOD AND DEVICES FOR OPERATING A RADIO-BASED TELECOMMUNICATIONS SYSTEM

(75) Inventors: Michael Jeschke, Stuttgart (DE); Pascal Agin, Sucy en Brie (FR)

(73) Assignee: Alcatel, Paris (FR)

( * ) Notice: Subject to any disclaimer, the term of this patent is extended or adjusted under 35 U.S.C. 154(b) by 808 days.

(21) Appl. No.: 10/617,129

(22) Filed: Jul. 11, 2003

(65) Prior Publication Data

US 2004/0032841 A1    Feb. 19, 2004

(30) Foreign Application Priority Data

Aug. 13, 2002   (EP) .................................. 02360241

(51) Int. Cl.
*H04B 7/00* (2006.01)
*H04B 7/216* (2006.01)
*H04Q 7/00* (2006.01)
*H04Q 7/20* (2006.01)

(52) U.S. Cl. ....................... 370/335; 370/310; 370/332; 370/342; 455/403

(58) Field of Classification Search ........ 370/277–283, 370/294–295, 310, 447, 312–314, 329–333, 370/341–350, 441–445, 480, 491, 522, 532, 370/537, 455, 458–462, 335–338, 470, 509–510, 370/512–514; 455/13.4, 71, 68–69, 161.2–161.3, 455/403, 420, 434, 511, 515–517, 522–525, 455/17, 19, 24, 123, 556.2, 550.1, 88, 70
See application file for complete search history.

(56) References Cited

U.S. PATENT DOCUMENTS

| 6,498,785 B1 * | 12/2002 | Derryberry et al. ......... 370/311 |
| 6,822,948 B2 * | 11/2004 | Bergstrom et al. .......... 370/332 |
| 6,856,812 B1 * | 2/2005 | Budka et al. ............... 455/522 |
| 6,934,245 B2 * | 8/2005 | Kwak et al. ................ 370/204 |
| 6,947,476 B2 * | 9/2005 | Song .......................... 375/149 |
| 6,987,746 B1 * | 1/2006 | Song .......................... 370/335 |
| 7,010,317 B2 * | 3/2006 | Hwang et al. .............. 455/522 |
| 2002/0082020 A1 | 6/2002 | Lee et al. |
| 2003/0088695 A1 * | 5/2003 | Kwak et al. ................ 709/238 |
| 2006/0189272 A1 * | 8/2006 | Willenegger et al. ...... 455/3.01 |

\* cited by examiner

FOREIGN PATENT DOCUMENTS

EP    1 206 047 A2   5/2002

*Primary Examiner*—Meless Zewdu
(74) *Attorney, Agent, or Firm*—Sughrue Mion, PLLC

(57) ABSTRACT

For radio transmission on the downlink the transmit power must be calculated also for that signals which shall be sent on the common physical channel, known as secondary common control physical channel (SCCPCH), in the Frequency Division Duplex mode of the Universal Mobile Telecommunications System. In the case where no data is transmitted in a SCCPCH frame, the transmit power level is not defined for SCCPCH data bits. Therefore the well-known adaptation of the TFCI and Pilot powers cannot be applied. The solution proposed here is to set or change the transmit indicator power of the TFCI indicator bits in dependence from a virtual reference power which is calculated from parameters comprising first power values preferably defined by the radio network controller (CRNC) or comprising second power values representing an average of that transmit powers which have been used to transmit that data within at least two of the preceding frames. The virtual reference power can also be a fixed power value which is signalled by the radio network controller or which is a hard-coded value stored in the base station. An advantage of is that the TFCI and the Pilot powers can both be calculated very easily by adapting them to the virtual reference power in the some manner as this is done in the normal case with respect to the data bit power.

10 Claims, 3 Drawing Sheets

| Frame | TFC (-> DAT) |
|---|---|
| RFk | PCH + FACH1 |
| RFk+1 | FACH1 |
| RFk+2 | PCH |
| RFk+3 | --- (No Data) |
| RFk+4 | PCH + FACH2 |
| RFk+5 | PCH + FACH1 + FACH2 |
| RFk+6 | --- (No Data) |
| ⋮ | ⋮ |
| RFk+n | FACH1 + FACH2 |

| Frame | TFC (-> DAT) |
|---|---|
| RFk | PCH + FACH1 |
| RFk+1 | FACH1 |
| RFk+2 | PCH |
| RFk+3 | ---      (No Data) |
| RFk+4 | PCH + FACH2 |
| RFk+5 | PCH + FACH1 + FACH2 |
| RFk+6 | ---      (No Data) |

⋮            ⋮

| RFk+n | FACH1 + FACH2 |
|---|---|

Fig. 3

METHOD AND DEVICES FOR OPERATING A RADIO-BASED TELECOMMUNICATIONS SYSTEM

The invention is based on a priority application EP 02 360 241.0 which is hereby incorporated by reference.

FIELD OF THE INVENTION

The invention is related to a method and to a device or a set of devices for operating a radio-based telecommunications system wherein a common physical channel is used to transmit data on the downlink from a radio base station being controlled by a radio network controller to a mobile user equipment, wherein the data is transmitted in frame slots. In particular the invention is related to, but not restricted to, calculating the transmit power of signals to be sent on the common physical channel, known as secondary common control physical channel, in the FDD (Frequency Division Duplex) mode of the so-called UMTS (Universal Mobile Telecommunications System) which is a CDMA radio-based telecommunications system specified by the 3GPP (Third Generation Partnership Project) within the ETSI (European Telecommunications Standards Institute).

BACKGROUND OF THE INVENTION

This secondary common control physical channel (S-CCPCH) is known to be a physical common channel on the downlink that may carry basically two transport channels, namely the paging channel (PCH) and the forward access channel (FACH). The S-CCPCH is therefore used for paging and for transmission of signalling bits or quite small amount of data. There may be one or several S-CCPCHs in each cell with different gross bit-rates in function of the traffic load on this physical channel.

The S-CCPCH is a physical channel comprising frames which are subdivided into time slots, each time slot is having a data field for inserting useful data bits, namely data bits of the transport channels PCH and/or FACH. As a result from this the S-CCPCH is able to carry zero or one PCH transport channel and zero, one or several FACH transport channels. These different combinations of the transport channels are called TFC (transport format combinations). The possible TFCs do also include the case that temporally no data at all is transmitted on the S-CCPH. In order to indicate the used TFC there is defined a so-called TFCI (TFC identification) which is a number indicating the used TFC.

The TFCI bits are transmitted in a field within the slots of the S-CCPCH frame, so that all mobile stations, i.e. user equipments (UEs), within the radio cell can know the currently used TFC.

Further to this there are so-called pilot bits which are inserted in a further field of the slots, these pilot bits are representing a bit pattern for constituting a pilot signal which allow at the receiving end, i.e. at the UE, to optimize the equalization of the data received on the S-CCPCH.

At the transmitting end, i.e. at the base station, the transmit power level to be used for data bits transmitted on the S-CCPCH is controlled by a radio network controller (RNC) which is connected to that base station. The transmit powers for the TFCI bits and Pilot bits which may be different are also controlled by the RNC by adapting these powers relatively to the currently used power of the S-CCPCH data bits.

SUMMARY OF THE INVENTION

A problem arises when in a S-CCPCH frame no data, i.e. neither PCH nor FACH data, is to be transmitted. Indeed, in this case, no transmit power level is defined for S-CCPCH data bits. Therefore the well-known adaptation of the TFCI and Pilot powers cannot be applied.

Because of that the TFCI indicates the TFC to be used and also indicates if no data is transmitted there is a further problem to be solved. This is that the TFCI power cannot be calculated in this case, although the TFCI bits must be reliably received at the receiving mobile station in order to decode well and to detect correctly the TFCI. A correct TFCI detection would not only help the mobile station be aware of a vacant data field, but would also allow the mobile station to switch into a sleep mode and to save battery power.

The solution to all these problems is defined according to the invention as claimed. Accordingly it is proposed to set or change the transmit indicator power of the TFCI indicator bits in dependence from a virtual reference power which is calculated from parameters comprising first power values defined by the radio network controller or comprising second power values representing an average of that transmit powers which have been used to transmit that data within at least two of the preceding frames. The virtual reference power can also be a fixed power value which is signalled by the radio network controller or which is a hard-coded value stored in the base station.

An advantage of this proposed solution is that in the case when no data is transmitted the TFCI and Pilot powers can both be calculated very easily by adapting them to the virtual reference power in the same manner as this is done in the normal case with respect to the data bit power.

Further advantages will result from more specific features as claimed in the subclaims, these features are also introduced in the preferred embodiment which will be described later in more detail.

Accordingly each slot of the frame is further having a field for carrying bits of a pilot, said pilot being a training sequence for optimizing the reception on said common physical channel, and the method is further comprising the steps of setting the transmit pilot power of the pilot bits in dependence from said data power of the data bits if any data is transmitted, or if no data is transmitted adapting the transmit pilot power of said pilot bits to said virtual reference power.

To this respect a further feature may be that the transmit indicator power and/or the transmit pilot power are each adapted to said virtual reference power by adding an respective offset power to said virtual reference power.

Another additional feature may be that the transmit indicator power and/or the transmit pilot power are each adapted to said virtual reference power as well as to said transmit data power by adding the same respective offset power.

Further to this the first power values may be predefined maximum power levels which shall not be exceeded on the transport channels.

To this respect one of the first power values may be the maximum pilot channel power and another one may be the maximum forward access channel power which shall not be exceeded on the respective transport channels.

Another feature may be added in that the reference power is calculated by selecting out of said maximum power levels the lowest power level for being used on the transport channels.

Alternatively the reference power may be calculated by building from said maximum power levels a mean power level for being used on the transport channels.

BRIEF DESCRIPTION OF THE DRAWINGS

The invention and the advantages resulting therefrom will now be described in more details by presenting a preferred embodiment and making reference to the following figures:

FIG. 3 which is showing a table of allowed transport format combinations;

In FIG. 1 there is shown a schematic drawing of the architecture of a radio based telecommunications system, having at least one radio network controller CRNC for controlling several base stations NB, also called NodeBs, one of them being shown as an example in FIG. 1. Each base station NB is providing radio service to several mobile user equipments UE, one of them being shown as an example in FIG. 1. Beside other physical channels there is implemented the so-called secondary common physical channel SCCPCH, which is a downlink channel for transmitting information and data from the base station NB to the respective user equipment UE. Basically this SCCPCH is used to carry different transport channels, namely a paging channel PCH and one or more forward access channels, for example FACH1 and FACH2, as shown in FIG. 1. This is only a example of organizing the SCCPCH. Other combinations of transport channels, in particular of FACHs and PCHs. The organization of the SCCPCH and the transmission mode used is becoming more apparent, when looking at FIG. 2.

In FIG. 2 there is shown the frame structured organization of the SCCPCH, the transmission on this physical channel being performed by transmitting radio frames RFk, RFk+1 etc. Each frame is having a specific number of time slots, for example 15 time slots S0, S1 to S14. In each time slot, for example Si, there are transmitted data bits within a specific data field DAT. Also indicator bits are transmitted in a field TFCI and further pilot bits are transmitted in a pilot data field PLT. The pilot bits may be sent in addition to the TFCI bits or no pilot bits may be sent at all. The field DAT is being used to transport the useful data bits from the aforementioned transport channels PCH, FACH1 and FACH2. The DAT field is the second field within each time slot, whereas the first field is assigned to carrying bits of the indicator TFCI, which is the so called transport format combination indicator, giving information about the content of the DAT field.

In particular the TFCI is indicating according to which combination the DAT fields are used to carry the bits of the transport channels. This combination, the so-called transport format combination TFC, may change from frame to frame as shown in FIG. 3:

As an example there is shown that first the radio frame RFk is carrying PCH bits as well as FACH1 bits, whereas the succeeding next radio frame RFk+1 is exclusively carrying FACH1 bits. Then the next frame RFk+2 is exclusively carrying PCH bits, whereas the further succeeding frame RFk+3 is carrying no data bits at all. Thereafter the frame RFk+4 is again carrying data, namely PCH bits, as well as FACH2 bits. And the next frame RFk+4 is carrying all kinds of data bits, namely PCH and FACH1 and FACH2 bits. In contrast to this the following frame RFk+6 is carrying no data like frame RFk+3. This is only an example of TFCs.

Other combinations may be possible. As shown in Fi 3 the TFC is defines the types of transport channels being used. Further to this the TFC may also define the number and size of transport blocks for each transport channel or similar parameters.

The transport format combination TFC may change from frame to frame as shown in FIG. 3. Also a combination carrying both kinds of FACH bits is possible, as shown as an example in frame RFk+n.

The TFC to be used in the frame is indicated by the TFCI which has values to indicate the combination to be used from the different combinations of transport channels. The TFCI has also a value to indicate if no data is to be sent in the frame.

Figure 1:
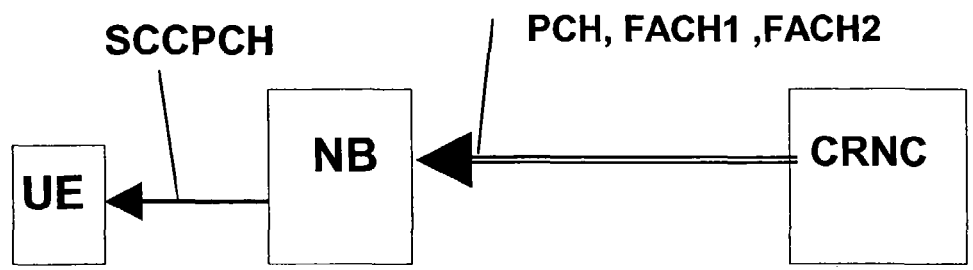
FIG. 1 which is showing a schematic drawing of the architecture of a radio based telecommunication system.
Figure 2:
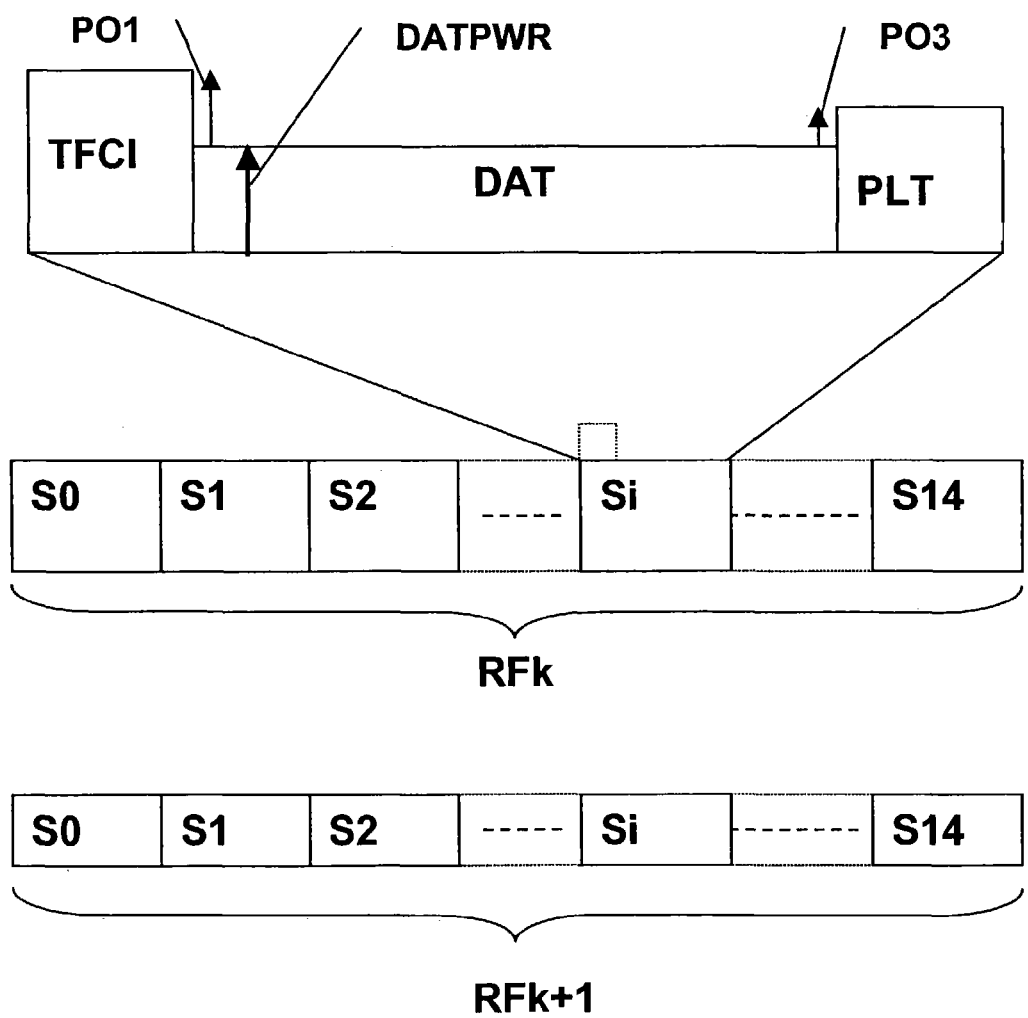
FIG. 2 which is showing the organization of the common physical channel and its breakdown into frame slots.

When coming back to FIG. 2 there is shown that each field of the slot, namely TFCI, DAT and PLT, is having a separate transmit power level. The transmit power DATPWR of the DAT field is set according to parameters which are given by the radio network controller (see CRNC in FIG. 1) for those transport channel bits (PCH bits or FACH bits) which are inserted in the current DAT field.

This means that the CRNC is giving a predefined PCH power for setting that power level DATPWR when PCH are inserted into the DAT field. In other cases, when FACH bits are inserted, then the CRNC is giving the so-called MAX-FACHPWR. This means that in all cases when the DAT field is filled with useful data from the transport channels the transmit power DATPWR is set to a value which is depending on these parameters given by the CRNC.

Starting from this power level DATPWR the power levels for the other fields, namely for TFCI and PLT fields, are adapted thereto by adding specific power offsets PO1 or PO3 respectively. This results in a distinct setting of powers applied to the respective fields within the time slots.

The problem occurs in that cases when no data is sent at all. This means that if the transport format combination TFC which is currently used in a distinct radio frame (e.g. in RFk+3 or RFk+6 from FIG. 3) having a vacant DAT field, that there is no specific power level DATPWR to be set at all. Thus no adaptation of the TFCI and PLT powers can be applied.

Figure 4:
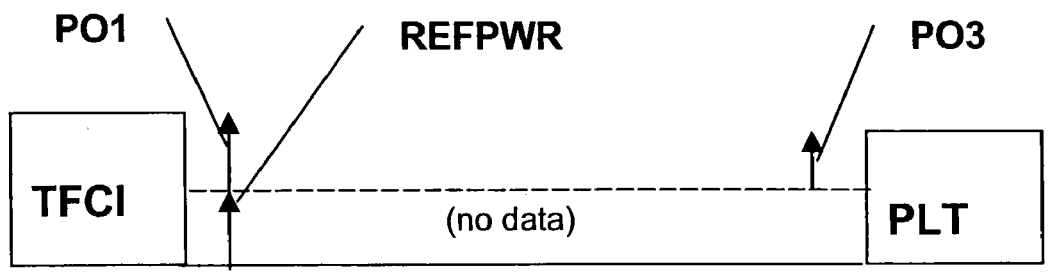
FIG. 4 which is showing the transmit power levels of sections on the common physical channel, if no data is sent.

According to the invention it is proposed to introduce a virtual reference power in these specific cases when no data is sent. It is also possible that no TFCI and/or pilot bits are sent at all. The principle of the invention will become more apparent from the following description of FIGS. 4 to 6:

As can be seen from FIG. 4 there is shown a time slot having first a field TFCI and second a field to insert data and third a field to insert pilot bits, but in the data field there is no data present. According to the invention there is calculated a reference power REFPWR which is a virtual value derived from parameters, said parameters are defined by the radio network controller or are derived from power values which are representing an average value of that transmit powers which have already being used in preceding frames. Then after a virtual reference value REFPWR has been calculated the other power values for the TFCI and PLT field can be easily set by adding the respective power offsets, PO1 or PO3.

Figure 5:
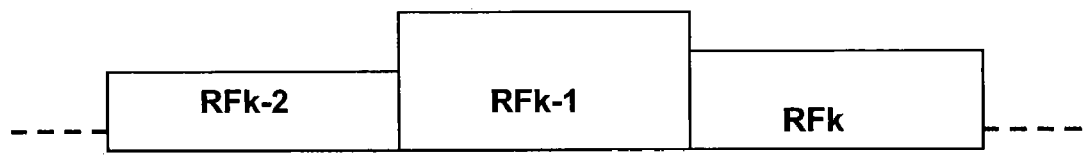
FIG. 5 which is showing an extract of a sequence of frames.

As can be seen from FIG. 5 the solution according to the invention is resulting in a sequence of transmitted radio frames, e.g. RFk−2, RFk−1, RFk etc., each frame having a given power level for the TFCI and the PLT bits, despite of fact that data is sent or not.

This has the effect that the TFCI indicator as well as the PLT signal can always be received at the receiving end, i.e. at the user mobile equipment (see UE in FIG. 1), at a receiving level which is sufficient for a reliable detection of that indicator and for a reliable demodulation and decoding of the received information bits. In particular for the TFCI this means that the TFCI bits are always received well also in those cases when no data is transmitted, thereby indicating the transport format combination TFC which is currently in use. This effect could not be afforded by the prior art system.

In addition to this the proposed solution has the advantage that the distinct power levels for the TFCI and PLT fields can be obtained in both cases, i.e. in the cases when data is sent and in the cases when no data is sent, always by applying the some procedure, i.e. by adding the respective power offsets.

Figure 6:
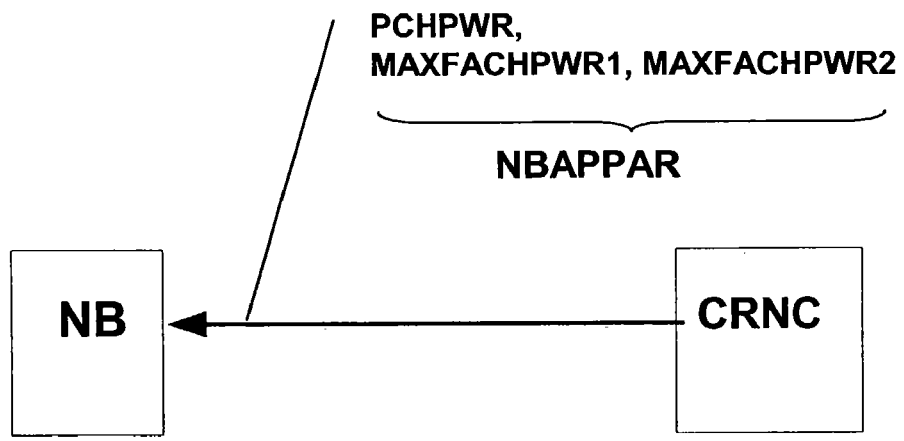
FIG. 6 which is showing the signalling of parameters from the radio network controller to the base station.

In FIG. 6 there is shown in a schematic drawing the signalling of the parameters which are sent from the radio network controller CRNC to the base station NB for constructing the virtual reference power in the case when no data is sent. These parameters are in more detail: the paging power level PCHWR to be used for paging bits and the maximum power levels MAXFACHPWR1 and MAXFACHPWR2 for defining the maximum power levels to be used on the forward access channels. All these parameters are sent within a protocol called NBAP. Therefore these parameters are also called NBAP parameters NBAPPAR. One approached to construct the virtual reference power (see REFPWR in FIG. 4) is to take these parameters and to calculate the reference power therefrom. Another approach would be to construct the reference power from average power value derived from those frames which have been transmitted before. This means, and reference here is made to FIG. 4, that the virtual reference power for the current frame RFk is calculated by averaging those power levels which have been used in the preceding frames RFk–1 and RFk–2. The calculation of the reference power is preferably performed by only considering the data bits power of the previous frames. It is a matter of implementation to decide whether to build an average value from at least two of some of the proceeding frames or to take again the latest one from the last frame. The calculation of the reference power is preferably performed by only considering the data bits power of the previous frames.

The described invention is in particular applicable to the so-called UMTS (Universal Mobile Telecommunications System), but not excluded to be applied in other radio-based telecommunications systems.

The invention claimed is:

1. A method of operating a radio-based telecommunications system, wherein a common physical channel is used to transmit data on a downlink from a radio base station controlled by a radio network controller, to a mobile user equipment, wherein the data is transmitted in frame slots of a frame, the frame representing a combination of transport channels, and wherein each of the frame slots of the frame comprise a field for carrying data bits and a field for carrying indicator bits, wherein said indicator bits indicate the combination of said transport channels used in said frame, and indicates if no data is transmitted in said frame, wherein the method comprising:
if data is transmitted in the frame, setting a transmit indicator power of the indicator bits based on a transmit data power of the data bits, and
if no data is transmitted in the frame, setting the transmit indicator power of said indicator bits based on a virtual reference power, wherein the virtual reference power is calculated based on one of a first power value defined by a radio network element, and a second power value representing an average of transmit powers used to transmit data within at least two preceding frames.

2. The method according to claim 1, wherein each frame slot further comprises a field which carries pilot bits, wherein said pilot bits are a pattern for optimizing the reception of the data on said common physical channel, the method further comprising:
if data is transmitted, setting a transmit pilot power of the pilot bits to based on said transmit data power of the data bits, and
if no data is transmitted, setting the transmit pilot power of said pilot bits based on said virtual reference power.

3. The method according to claim 1, wherein setting the transmit indicator power and the transmit pilot power to said virtual reference power by adding a respective power offset to said virtual reference power.

4. The method according to claim 3, wherein the transmit indicator power and the transmit pilot power are each set to said virtual reference power as well as to said transmit data power by adding the same respective power offset.

5. The method according to claim 1, wherein the first power values are predefined maximum power levels which are not exceeded on the transport channels.

6. The method according to claim 5, wherein one of the first power values comprise a paging channel power, and wherein at least another one is a maximum forward access channel power which does not exceeded on a respective forward access channel.

7. The method according to claim 5, wherein the virtual reference power is calculated by selecting a lowest power level from said maximum power levels which are used on the transport channels.

8. The method according to claim 5, wherein the virtual reference power is calculated based on a mean power level based on said maximum power levels used on the transport channels.

9. The method according to claim 5, wherein the virtual reference power is calculated by selecting a lowest power level being used at all from said maximum power levels.

10. A device for operating a radio-based telecommunications system, wherein a common physical channel is used to transmit data on a downlink from a radio base station controlled by a radio network controller, to a mobile user equipment, wherein the data is transmitted in frame slots of a frame, the frame representing a combination of transport channels, and wherein each of the frame slots of the frame comprise a field for carrying data bits and a field for carrying indicator bits, wherein said indicator bits indicate the combination of said transport channels used in said frame, and indicates if no data is to be transmitted in said frame, the device comprising:
means for setting a transmit indicator power of the indicator bits based on a transmit data power of the data bits, if data is transmitted in the frame, and
means for setting the transmit indicator power of said indicator bits, if no data is transmitted in the frame based on a virtual reference power, wherein the virtual reference power is calculated based on one of a first power value defined by a radio network element, and a second power value representing an average of transmit powers used to transmit data within at least two preceding frames.

* * * * *